United States Patent [19]

Thrap

[11] Patent Number: 4,466,052
[45] Date of Patent: Aug. 14, 1984

[54] PROGRAMMABLE DC-TO-AC VOLTAGE CONVERTER

[76] Inventor: Guy C. Thrap, 2171 La Amatista Rd., Del Mar, Calif. 92014

[21] Appl. No.: 330,166

[22] Filed: Dec. 14, 1981

[51] Int. Cl.³ .............................................. H02M 1/12
[52] U.S. Cl. .................................................... 363/41
[58] Field of Search .................... 363/41, 42, 132, 134

[56] References Cited

U.S. PATENT DOCUMENTS

| | | | |
|---|---|---|---|
| 3,376,490 | 4/1968 | Osugi | 363/41 |
| 3,649,902 | 3/1972 | Dunbar | 363/41 |
| 3,958,171 | 5/1976 | Sekino | 363/41 |
| 3,976,932 | 8/1976 | Collins | 363/132 |
| 4,290,108 | 9/1981 | Woehrle et al. | 363/41 X |
| 4,348,719 | 9/1982 | Hicks et al. | 363/132 |

Primary Examiner—William M. Shoop
Attorney, Agent, or Firm—Brown & Martin

[57] ABSTRACT

A programmable DC-TO-AC voltage converter for converting a DC voltage signal provided across two DC voltage terminals to an AC voltage signal having predetermined characteristics. The system includes an AC voltage terminal; a first switch connected between the AC voltage terminal and one of the DC voltage terminals; a second switch connected between the AC voltage terminal and the other of the DC voltage terminals; and a bistable switching circuit coupled to the first and second switches for operating the first and second switches to alternatively connect either the one DC voltage terminal or the other DC voltage terminal to the AC voltage terminal in an alternating high frequency sequence to provide a high frequency pulsed voltage signal at the AC voltage terminal. The bistable switching circuit sequentially provides a pulse-width-modulated control signal to operate the first and second switches at a predetermined high frequency; and varies the duty cycle of the control signal pulses at a predetermined low frequency in accordance with a predetermined waveform pattern at the predetermined low frequency to thereby vary the duty cycle of the high frequency pulsed voltage signal at the AC voltage terminal in accordance with the predetermined waveform pattern at the predetermined low frequency. The system also includes a low pass filter connected to the AC voltage terminal for providing an AC voltage output signal at the predetermined low frequency and having the predetermined waveform, such as a 60 Hz sine wave.

7 Claims, 2 Drawing Figures

PROGRAMMABLE DC-TO-AC VOLTAGE CONVERTER

BACKGROUND OF THE INVENTION

The present invention generally pertains to DC-to-AC voltage conversion and is particularly directed to predetermining the characteristics of the converted AC voltage signal.

DC electrical power can be generated by alternative energy systems such as arrays of photovoltaic cells. In some states, notably California, excess electrical power generated by alternative energy systems can be sold to public electricity companies. However, before such electrical power can be transferred onto the grids of a public electricity company, it must be converted to the same form as the electrical power generated and placed on the grids by the public electricity companies. This means that the DC electrical power generated by the alternative energy systems must be converted to AC electrical power having a predetermined frequency, waveform and phase in accordance with the specifications of the public electricity company.

SUMMARY OF THE INVENTION

The present invention is a programmable DC-TO-AC voltage converter for converting a DC voltage signal provided across two DC voltage terminals to an AC voltage signal having predetermined characteristics. The converter of the present invention includes an AC voltage terminal; a first switch connected between the AC voltage terminal and one of the DC voltage terminals; a second switch connected between the AC voltage terminal and the other of the DC voltage terminals; and a bistable switching circuit coupled to the first and second switches for operating the first and second switches to alternatively connect either the one DC voltage terminal or the other DC voltage terminal to the AC voltage terminal in an alternating high frequency sequence to provide a high frequency pulsed voltage signal at the AC voltage terminals. The bistable switching circuit sequentially provides a pulse-width-modulated control signal to operate the first and second switches at a predetermined high frequency; and varies the duty cycle of the control signal pulses at a predetermined low frequency in accordance with a predetermined waveform pattern at the predetermined low frequency to thereby vary the duty cycle of the high frequency pulsed voltage signal at the AC voltage terminal in accordance with the predetermined waveform pattern at the predetermined low frequency.

The bistable switching circuit includes a first clock for providing a first pulsed clock signal at N times the predetermined high frequency, wherein N is an integer greater than one; a divide-by-N counter connected to the first clock for providing a pulsed set signal at the predetermined high frequency; an R-S flip-flop connected to the divide-by-N counter to be set in response to the set signal; a programmable counter connected to the divide-by-N counter to enable count signals indicating programmed counts to be loaded in the programmable counter sequentially in response to the set signal, connected to the first clock for counting the pulses in the first clock signal and connected to the flip-flop for providing a reset signal thereto upon reaching a pulse count equal to the programmed count loaded therein to thereby cause the flip-flop to provide the control signal; a second clock for providing a second pulsed clock signal at N' times the predetermined low frequency, wherein N' is an integer greater than one; a divide-by-N' counter connected to the second clock for providing a sequential count signal that is repetitive at the predetermined low frequency; and a memory having a sequence of programmed counts stored therein to be read out in response to the sequential count signal for defining the predetermined waveform pattern. The memory is connected to the programmable counter and the divide-by-N' counter for providing the sequence of programmed counts to the programmable counter in response to the sequential count signal to cause the programmable counter to vary the timing of the reset signal in accordance with the predetermined waveform pattern at the predetermined low frequency to thereby accordingly vary the duty cycle of the high frequency pulsed signal at the AC voltage terminal. The converter further includes a low pass filter connected to the AC voltage terminal for filtering the high frequency pulsed voltage signal to provide an AC voltage output signal at the predetermined low frequency and having the predetermined waveform.

The converter of the present invention also may include a synchronizing circuit coupled to the bistable circuit for synchronizing the variation of the duty cycle of the high frequency pulsed voltage signal in response to a synchronizing signal at the predetermined low frequency to thereby synchronize the phase of the AC voltage output signal.

Accordingly, the converter of the present invention is useful for converting DC voltage signals obtained from alternative energy systems into AC voltage signals having characteristics that enable such AC signals to be readily transferred onto the grids of the public electricity companies.

Additional features of the present invention are described in relation to the description of the preferred embodiment.

DESCRIPTION OF THE PREFERRED EMBODIMENT

Figure 1:
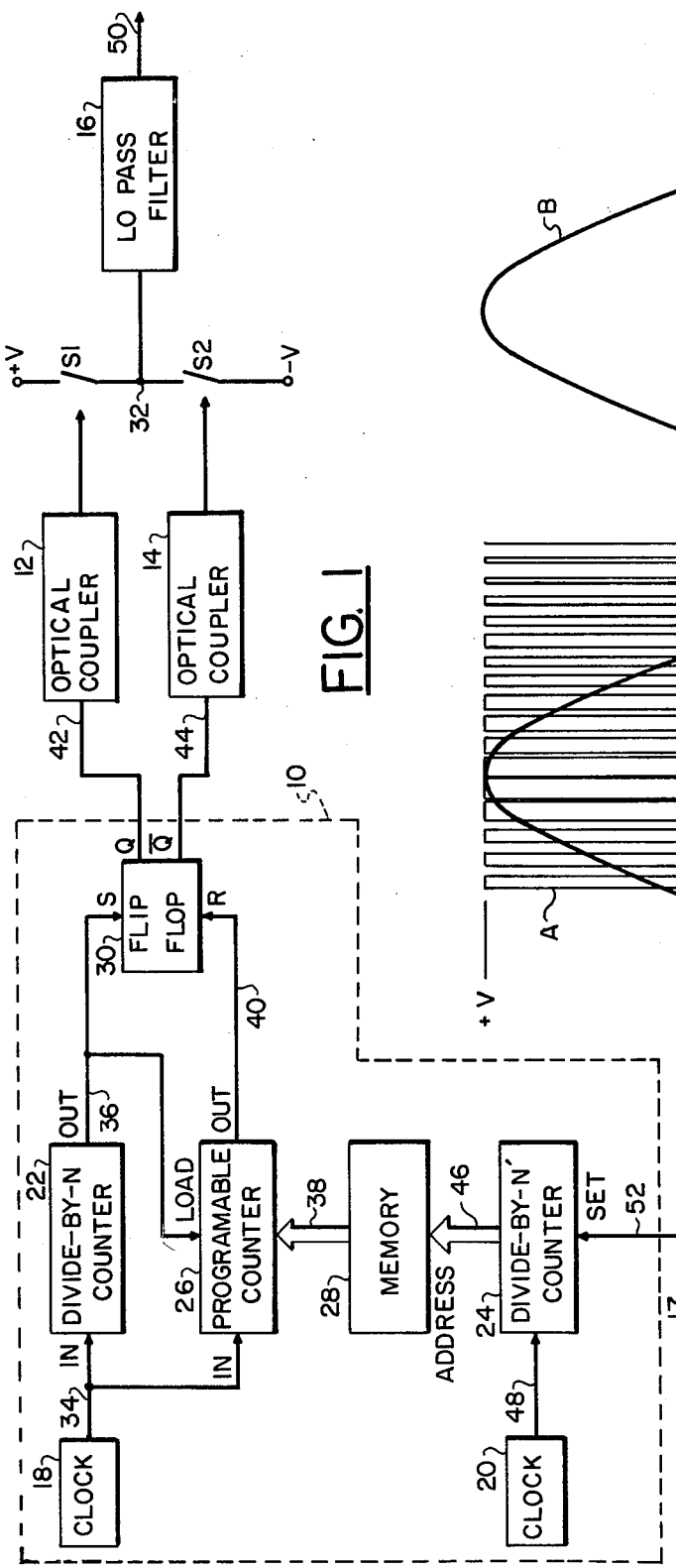
FIG. 1 is a block diagram of the voltage converter of the present invention.

Referring to FIG. 1, a preferred embodiment of the programmable DC-TO-AC voltage converter of the present invention includes a bistable switching circuit 10, a first optical coupler 12, a second optical coupler 14, a low pass filter 16, a first switch S1, a second switch S1 and a synchronizing circuit 17. The bistable switching circuit 10 includes a first clock 18, a second clock 20, a divide-by-N counter 22, a divide-by-N' counter 24, a programmable counter 26, a memory 28 and an R-S flip-flop 30.

A DC voltage signal to be converted is provided across two DC voltage terminals +V and −V.

The first switch S1 is connected between an AC voltage terminal 32 and one of the DC voltage terminals +V.

The second switch S2 is connected between the AC voltage terminal 32 and the other DC voltage terminal −V. The switches S1 and S2 are high speed power transistors, such as VMOS FETS (field effect transistors).

The first and second switches S1 and S2 are coupled to the bistable switching circuit 10 by the first and second optical couplers 12 and 14 respectively. The optical couplers 12, 14 serve to electrically isolate the bistable switching circuit 10 from the switches S1 and S2. As a result, the bistable switching circuit 10 can be made of components that are not made to withstand high voltage transients.

The bistable switching circuit 10 is coupled to the first and second switches S1 and S2 for operating the first and second switches S1 and S2 to connect either the one DC voltage terminal +V or the other DC voltage terminal −V to the AC voltage terminal 32 in an alternating sequence at a high frequency, such as 50 KHz. As a result, a high frequency pulsed voltage signal is provided at the AC voltage terminal 32.

Within the bistable switching circuit 10, the first clock 18 provides a first pulsed clock signal on line 34 to the count inputs of the divide-by-N counter 22 and the programmable counter 26.

The divide-by-N counter 22 counts the pulses in the first pulsed clock signal on line 34 from the first clock 18. In the divide-by-N counter, N is an integer greater than one. In the preferred embodiment, N is 256. Thus the divide-by-N counter 22 provides a set pulse at its output on line 36 upon every 256th count of the pulses in the first clock signal received on line 34 from the first clock 18. The frequency of the first pulsed clock signal on line 34 from the first clock 18 is N times the frequency at which the bistable switching circuit 10 sequentially operates the switches S1 and S2 to provide the high frequency pulsed voltage signal at the AC voltage terminal 32, which is 256 times 50 KHz, or 12.8 MHz. Accordingly, the divide-by-N counter 36 provides a 50 KHz pulsed set signal on line 36 to the set input of the flip-flop 30 and to the load input of the programmable counter 26.

The R-S flip-flop 30 is set in response to each pulse of the 50 KHz set signal from the divide-by-N counter 22 on line 36. The R-S flip-flop 30 is reset in response to each pulse of a reset signal provided on line 38 from the output of the programmable counter 26.

The programmable counter 26 is connected to the divide-by-N counter 22 to enable count signals indicating programmed counts to be loaded in the programmable counter 26 sequentially on lines 38 from the memory 28 in response to the set signal on line 36 from the divide-by-N counter 22. The programmable counter 26 is connected to the first clock 18 for counting the pulses in the first clock signal on line 34, and is connected to the flip-flop 30 for providing a reset signal thereto on line 40 upon reaching a pulse count equal to the programmed count loaded therein to thereby cause the flip-flop 30 to provide complementary pulse-width-modulated control signals at its Q and Q outputs onto lines 42 and 44.

The optical couplers 12 and 14 respectively respond to the complementary control signals on lines 42 and 44 by providing logic level gating signals on line 46 and 48 for controlling the operation of the switches S1 and S2.

Returning to the bistable control circuit 10, the memory 28 has a sequence of programmed counts stored therein to be read out in response to being addressed by a sequential count signal on lines 46 from the divide-by-N' counter 24 for defining a predetermined waveform pattern. In the preferred embodiment, the predetermined waveform pattern is a sine wave; and the memory 28 has a capacity of thirty-two eight-bit words for storing thirty-two different programmed counts. Preferably, the memory 28 is a programmable-read-only-memory (PROM).

The divide-by-N' counter 24 counts the pulses in a second pulsed clock signal on line 48 from the second clock 20. In the divide-by-N' counter, N' is an integer greater than one. In the preferred embodiment, N' is 64. The divide-by-N' counter 24 provides a count signal on lines 46 that is incremented by one count upon every 64th count of the pulses in the second clock signal received on line 48 from the second clock 20. Accordingly, a sequential count signal is provided on lines 46 from the divide-by N' counter 24 for addressing the memory 28. The sequential count signal on lines 46 is repetitive at a predetermined low frequency that is equal to the frequency of the second clock signal on line 48 divided by N'. Thus for a preferred predetermined low frequency of 60 Hz, the frequency of the second clock signal on line 48 is 60×64 or 3,840 Hz.

The memory 28 is programmed to provide a programmed count of 00000000 on lines 38 in response to the first count in the sequential count signal on lines 46 and to provide a programmed count of 11111111 on lines 38 in response to the thirty-second count in the sequential count signal on lines 46. The memory 28 is further programmed to provide increasing programmed counts in response to the first through thirty-second counts in the sequential count signal and to provide decreasing programmed counts in response to the thirty-third through the sixty-fourth counts of the sequential count signal in accordance with the preferred predetermined waveform pattern of a sine wave. Other waveform patterns can be provided in other embodiments.

Figure 2:
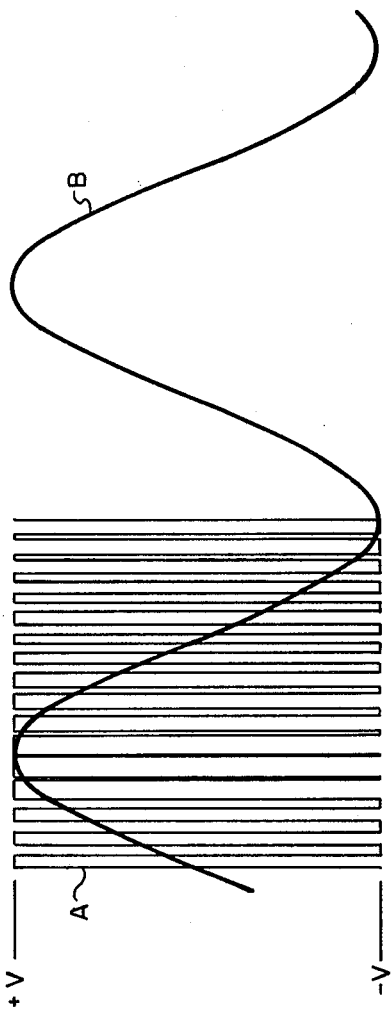
FIG. 2 illustrates the relationship between the high frequency pulsed signal and the AC voltage output signal provided by the converter of FIG. 1.

Thus, it is seen that the memory is connected to the programmable counter 26 and the divide-by-N' counter 24 for providing a sequence of programmed counts to the programmable counter 26 on lines 38 in response to the sequential count signal on lines 46 to cause the programmable counter 28 to vary the timing of the reset signal on line 40 to the flip-flop 30 in accordance with the predetermined sine wave pattern at the predetermined low frequency to thereby accordingly vary the duty cycle of the high frequency 50 Khz pulsed signal at the AC voltage terminal 32 as illustrated by waveform A in FIG. 2.

The high frequency pulsed signal at terminal 32 is filtered by the low pass filter 16 to provide an AC voltage output signal on line 50 at the predetermined low frequency of 60 Hz and having the predetermined sine wave pattern, as illustrated by waveform B in FIG. 2.

The synchronizing circuit 17 is coupled to the divide-by-N' counter 24 for resetting the divide-by-N' counter 24 in response to a synchronizing signal on line 52 at the predetermined low frequency to thereby synchronize the phase of the AC voltage output signal on line 50. Alternatively, the synchronizing circuit 17 may be omitted and the clock 20 and the divide-by-N' counter may be free running if the phase of the AC voltage output signal on line 50 need not be synchronized.

The specific frequency and count values set forth herein are applicable to the preferred embodiment only. Other values will be appropriate for other embodiments.

The DC-TO-AC voltage converter of the present invention is useful with any DC voltage source and not merely alternative energy systems. It is useful with DC sources provided by batteries or by rectified AC voltage signals. In the latter case, AC voltage signals at one frequency can be rectified to provide a DC voltage signal which is converted by the converter of the present invention to provide an AC voltage output signal at a different frequency. In this sense, the DC-TO-AC voltage converter of the present invention can be used in a frequency multiplier or a frequency divider system.

I claim:

1. A programmable DC-TO-AC voltage converter for converting a DC voltage signal provided across two DC voltage terminals to an AC voltage signal having predetermined characteristics, comprising an AC voltage terminal;

a first switch connected between the AC voltage terminal and one of said DC voltage terminals;

a second switch connected between the AC voltage terminal and the other of said DC voltage terminals;

a bistable switching circuit coupled to the first and second switches for operating the first and second switches to alternatively connect either the one DC voltage terminal or the other DC voltage terminal to the AC voltage terminal in an alternating high frequency sequence to provide a high frequency pulsed voltage signal at the AC voltage terminal, wherein the switching circuit includes first means for sequentially providing a pulse-width-modulated control signal to operate the first and second switches at a predetermined high frequency; and second means for varying the duty cycle of the control signal pulses at a predetermined low frequency in accordance with a predetermined waveform pattern at said predetermined low frequency to thereby vary the duty cycle of said high frequency pulsed voltage signal at the AC voltage terminal in accordance with said predetermined waveform pattern at said predetermined low frequency; and a low pass filter connected to the AC voltage terminal for filtering said high frequency pulsed voltage signal to provide an AC voltage output signal at said predetermined low frequency and having said predetermined waveform;

wherein the first means comprises a first clock for providing a first pulsed clock signal at N times said predetermined high frequency, wherein N is an integer greater than one;

a divide-by-N counter connected to the first clock for providing a pulsed set signal at said predetermined high frequency;

an R-S flip-flop connected to the divide-by-N counter to be set in response to said set signal; and a programmable counter connected to the divide-by-N counter to enable count signals indicating programmed counts to be loaded in the programmable counter sequentially in response to the set signal, connected to the first clock for counting the pulses in said first clock signal and connected to the flip-flop for providing a reset signal thereto upon reaching a pulse count equal to the programmed count loaded therein to thereby cause the flip-flop to provide said pulse-width-modulated control signal; and wherein the second means comprises a second clock for providing a second pulsed clock signal at N' times said predetermined low frequency, wherein N' is an integer greater than one;

a divide-by-N' counter connected to the second clock for providing a sequential count signal that is repetitive at said predetermined low frequency; and a memory having a sequence of programmed counts stored therein to be read out in response to being addressed by said sequential count signal for defining said predetermined waveform pattern, wherein the memory is connected to the programmable counter and the divide-by-N' counter for providing said sequence of programmed counts to the programmable counter in response to said sequential count signal to cause the programmable counter to vary the timing of said reset signal in accordance with said predetermined waveform pattern at said predetermined low frequency to thereby accordingly vary the duty cycle of said high frequency pulsed signal at the AC voltage terminal.

2. A converter according to claim 1 further comprising a synchronizing means coupled to the divide-by-N' counter for resetting the divide-by-N' counter in response to a synchronizing signal at said predetermined low frequency to thereby synchronize the phase of said AC voltage output signal.

3. A converter according to claim 1 further comprising synchronizing means coupled to the second means for synchronizing said variation of the duty cycle of said high frequency pulsed voltage signal in response to a synchronizing signal at said predetermined low frequency to thereby synchronize the phase of said AC voltage output signal.

4. A converter according to claim 1, further comprising means for electrically isolating the first and second switches from the bistable switching circuit.

5. A converter according to claim 1, wherein the first means provides complementary pulse-width-modulated control signals to operate the first and second switches at said predetermined high frequency.

6. A converter according to claim 5, wherein the second means comprises a second clock for providing a second pulsed clock signal at N' times said predetermined low frequency, wherein N' is an integer greater than one;

a divide-by-N' counter connected to the second clock for providing a sequential count signal that is repetitive at said predetermined low frequency; and a memory having a sequence of programmed counts stored therein to be read out in response to said sequential count signal for defining said predetermined waveform pattern, wherein the memory is connected to the programmable counter and the divide-by-N' counter for providing said sequence of programmed counts to the programmable counter in response to said sequential count signal to cause the programmable counter to vary the timing of said reset signal in accordance with said predetermined waveform pattern at said predetermined low frequency to thereby accordingly vary the duty cycle of said high frequency pulsed signal at the AC voltage terminal.

7. A converter according to claim 6, further comprising
synchronizing means coupled to the divide-by-N' counter for resetting the divide-by-N' counter in response to a synchronizing signal at said predetermined low frequency to thereby synchronize the phase of said AC voltage output signal.

* * * * *